United States Patent [19]

Shirakawa

[11] Patent Number: 4,932,640
[45] Date of Patent: Jun. 12, 1990

[54] HYDRAULIC CLAMP

[75] Inventor: Tsutomu Shirakawa, Amagasakishi, Japan

[73] Assignee: Kabushiki Kaisha KOSMEK, Hyogoken, Japan

[21] Appl. No.: 377,039

[22] Filed: Jul. 10, 1989

[30] Foreign Application Priority Data

Jul. 11, 1988 [JP] Japan .................. 63-173161

[51] Int. Cl.⁵ .............................. B23Q 3/08
[52] U.S. Cl. ..................................... 269/32
[58] Field of Search ...................... 269/24, 32, 35, 234, 269/91, 93, 94, 224, 285, 286; 91/410; 60/588

[56] References Cited

U.S. PATENT DOCUMENTS

| 3,700,227 | 10/1972 | Sessody | 269/24 |
|---|---|---|---|
| 4,365,792 | 12/1982 | Johns | 269/32 |
| 4,382,580 | 5/1983 | Hellander | 254/104 |
| 4,504,046 | 3/1985 | Yonezawa | |
| 4,506,871 | 3/1985 | Yonezawa | 269/32 |
| 4,524,630 | 6/1985 | Toth et al. | 254/104 |
| 4,826,146 | 5/1989 | Shirakawa | |

Primary Examiner—Robert C. Watson
Attorney, Agent, or Firm—Lowe, Price, LeBlanc, Becker & Shur

[57] ABSTRACT

In a hydraulic clamp adapted to fixedly secure an object such as a die, a workpiece and the like strongly to a machine tool such as an injection molding machine, a press machine and the like by means of multiplication action of a wedge, a drive chamber is formed in a clamp housing with its front end open and a clamp arm is inserted in the drive chamber to be vertically pivotable, a driving wedge is inserted between a wedge retaining surface defining an upper part of the drive chamber and a driven portion formed at a top of the clamp arm from behind and adapted to be moved longitudinally reciprocatively by means of a hydraulic cylinder, and a sliding shuttle member is interposed between the sliding contact surfaces of the driving wedge and of at least one of the wedge retaining surface and the driven portion to be slidable in a forward and backward direction within a given range.

12 Claims, 5 Drawing Sheets

HYDRAULIC CLAMP

BACKGROUND OF THE INVENTION

1. Field of the Invention

The present invention relates to a hydraulic clamp for fixedly securing an object such as a die, a workpiece and the like onto a machine tool such as an injection molding machine, a press machine and the like and more particularly to a wedge type multiplicatively forceful hydraulic clamp adapted to fixedly secure such an object strongly by the multiplication action of a wedge at the time of clamping.

2. Description of the Prior Art

Hitherto, as a wedge type multiplicatively forcefull hydraulic clamp there has been known the prior art proposed by the present inventor and disclosed in U.S. Pat. No. 4,504,046. The basic constitution of the prior art will be explained with reference to FIG. 14 as follows.

In a clamp housing 101 a drive chamber 103 is formed with its front end open. Into this drive chamber 103 a clamp arm 104 is inserted to be vertically pivotable therein. A fulcrum portion 104a is formed at the rear end of the bottom of the clamp arm 104, and a driven portion 104b is provided in the middle part of the top of the clamp arm 104. A clamping portion 104c is provided in the underside of the front part of the clamp arm 104. An upper portion of the drive chamber 103 is defined by a stationary wedge retaining surface 103a. A driving wedge 117 is inserted between the wedge retaining surface 103a and the driven portion 104b from behind. A hydraulic cylinder 105 is provided behind the driving wedge 117 so as to extend forward.

The driving wedge 117 is adapted to be moved forward and backward by the hydraulic cylinder 105. In the extended condition of the hydraulic cylinder 105 as indicated by a two-dot chain line, the driving wedge 117 is advanced so as to push down the clamp arm 104 through the driven portion 104b to the clamping position A. In the retracted condition of the hydraulic cylinder 105 as indicated by a solid line, the driving wedge 117 is retracted so as to release the driven portion 104b to the unclamping position B.

In the above basic constitution, as shown in FIG. 14, conventionally the driving wedge 117 is merely inserted directly between the wedge retaining surface 103a and the driven portion 104b.

According to the hydraulic clamp having such a basic constitution, a dynamical friction is prevailing between both the sliding contact surfaces of the driving wedge 117 and of the wedge retaining surface 103a and/or the driven portion 104b at the end of the clamping actuation and a statical friction is prevailing therebetween at the beginning of the unclamping actuation. Therefore, the hydraulic cylinder 105 is required to exert a larger retraction force at the beginning of the unclamping actuation than an extension force at the end of the clamping actuation correspondingly by the difference between the statical and dynamical frictional forces. As a result, there are following problems associated with the conventional constitution.

(a) A clamping force to be exerted by the hydraulic clamp is small.

Since the driving wedge 117 slides in direct contact with the wedge retaining surface 103a or the driven portion 104b, a coefficient of friction between both the sliding surface thereof is large.

In the case of the settlement of the unclamping force at a certain value, since the difference between the statical and dynamical frictional forces becomes larger by such a degree that the coefficient of friction between both the sliding contact surfaces is large, the clamping force becomes smaller correspondingly.

(b) A durability of the hydraulic clamp is low.

As the cumulate number of engagement and disengagement of the clamping wedge 117 is increased largely while the hydraulic clamp is used a long time, the sliding contact surfaces get damaged worse gradually. When the statical friction force between both the sliding contact surfaces becomes larger than a certain value, finally it becomes impossible to retract the driving wedge 117. Therefore, disadvantageously the service time of the hydraulic clamp becomes short.

SUMMARY OF THE INVENTION

The present invention is directed to solving the abovementioned problems and has for its object to provide a hydraulic clamp of which clamping force is increased and of which durability is improved.

For accomplishing the above-mentioned object, the present invention relates to modification of the basic constitution of the hydraulic clamp described in the '046 Patent, in which a sliding shuttle member is interposed between both the sliding contact surfaces of the driving wedge and of at least one of the wedge retaining surface and the drive portion to be slidable in a forward and backward direction within a certain extent. A coefficient of statical friction between both the sliding contact surfaces of the driving wedge and of the wedge retaining surface and/or the driven portion can be made small by precisely finishing the sliding contact surfaces of the sliding shuttle member and suitably selecting the material of the sliding shuttle member.

Incidentally, the sliding shuttle member can be supported by the driving wedge and besides by the wedge retaining surface and/or the driven portion.

The present invention with its structural features as described above have the following advantages.

(a) the clamping force of the hydraulic clamp can be increased.

Since the sliding shuttle member can be manufactured as a small component part separately from the clamp housing, the driving wedge and the clamp arm, it is easy to precisely finish the sliding contact surface thereof and besides it is greatly free to select the material thereof. Therefore, it becomes easy to reduce the coefficient of friction between both the sliding contact surfaces of the driving wedge and of the wedge retaining surface and/or the driven portion so that the difference between the statical frictional force at the beginning of the unclamping actuation and the dynamical frictional force at the end of the clamping actuation can be made small.

Therefore, when comparing with such a reference condition that the unclamping force is settled constant, the clamping force of the hydraulic clamp is increased correspondingly by the difference of frictional force reduced as noted above.

Incidentally, in the case that a lubricant is provided on the sliding contact surface of the sliding shuttle member, the coefficient of friction can be made smaller so that the clamping force can be increased more largely.

(b) The durability of the hydraulic clamp can be improved.

At the time of clamping actuation of the driving wedge or at the time of unclamping actuation thereof, firstly the sliding is caused through one of the upper and lower sliding contact surfaces of the sliding shuttle member and then the subsequent sliding is caused through the other sliding contact surface thereof. In this way, since the sliding distance can be allotted to two sliding contact surfaces of the sliding shuttle member respectively, the sliding distance of each sliding contact surface can be shortened and a degradation of the sliding contact surface thereof can be reduced correspondingly by the shortened distance. Further, even though one of the sliding contact surfaces is damaged due to a large number of cumulative engagements and disengagements of the driving wedge, the sliding is permitted trough the other sliding contact surface because the sliding shuttle member provides two sliding contact surfaces.

In this way, since the sliding shuttle member is less degraded due to the short sliding distance of the sliding contact surface thereof and is permitted to slide through the other sliding contact surface even though one of the sliding contact surfaces is damaged, the service life of the sliding contact surface is long and the durability of the hydraulic clamp is improved remarkably.

Incidentally, in case that the following constitution is added to the above-mentioned constitution, the durability of the hydraulic clamp is further improved. That is, the sliding shuttle member is inserted in an insertion groove therefor with forward and backward gaps to permit movement of the sliding shuttle member in a forward and backward direction and the gaps for permitting such a movement are settled a little larger than the retracting distance for wedge-disengagement of the driving wedge. In this case, since the relative sliding distance between the sliding shuttle member and the bottom of the insertion groove can be short enough for the wedge-disengagement, the service life of the sliding contact surface is further prolonged and the durability of the hydraulic clamp is improved.

Other features and advantages of the hydraulic clamp of this invention will become apparent from the following detailed description of several embodiments described in conjunction with the drawings.

BRIEF DESCRIPTION OF THE DRAWINGS

FIGS. 1 through 6 show one embodiment thereof;

FIG. 1 is a vertical sectional side view of a hydraulic clamp thereof;

FIG. 2 is a sectional view taken along the II—II indicated line in FIG. 1;

FIG. 3 is a sectional view taken along the III—III bent indicated line in FIG. 1;

FIG. 4 is an enlarged view of the principal part in FIG. 1 and showing an unclamping condition;

FIG. 5 is a view corresponding to FIG. 4 and showing a clamping condition;

FIG. 6 is a diagram showing the relation between a coefficient of friction and a clamping force;

FIGS. 7 through 11 are views showing variations of a sliding shuttle member and corresponding to FIG. 4 respectively;

FIGS. 12 and 13 are partial views showing other variations of the sliding shuttle member and corresponding to FIG. 3 respectively.

DESCRIPTION OF THE PREFERRED EMBODIMENT

The embodiments of the present invention will be explained with reference to the accompanying drawings hereinafter.

FIGS. 1 through 6 show one embodiment thereof.

Figure 1:
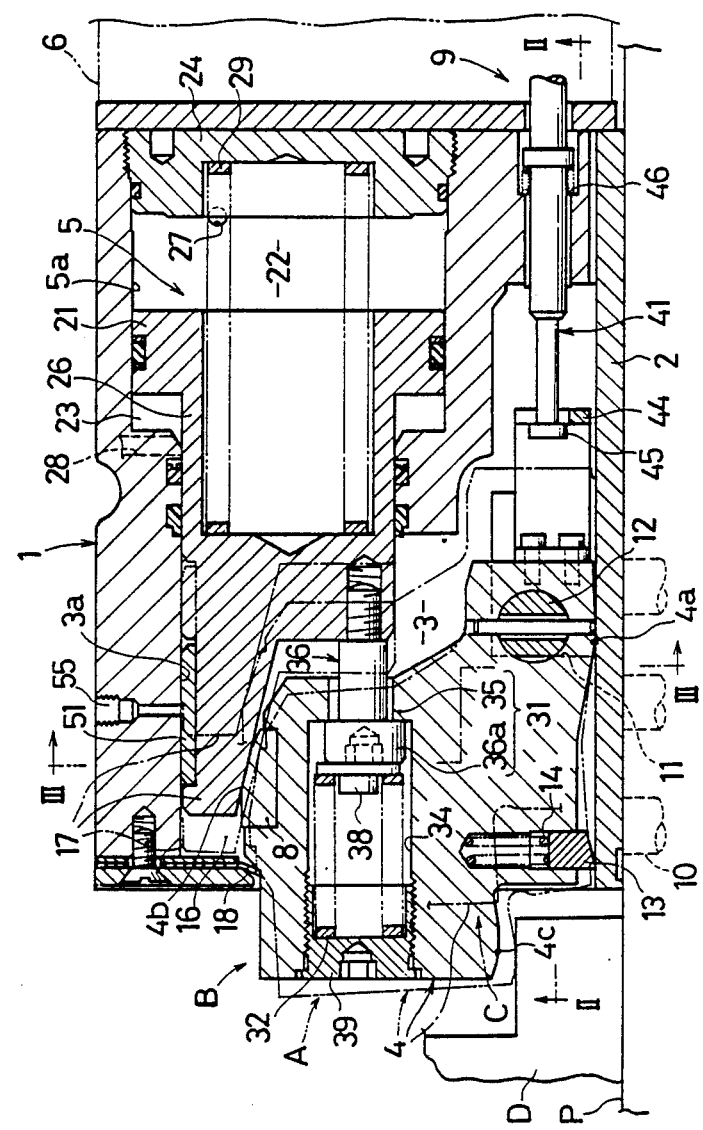
FIGS. 1 through 13 show the embodiments of the present invention.

In FIG. 1, symbol P designates a die-fixing plate of an injection molding machine or the like and a die D placed on it is fixedly secured thereto by means of hydraulic clamps.

Figure 2:
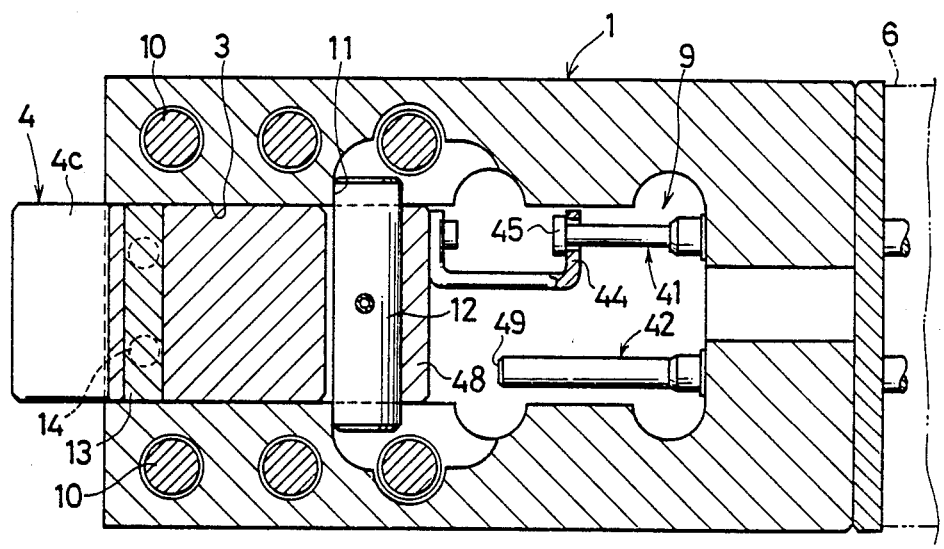
Figure 3:
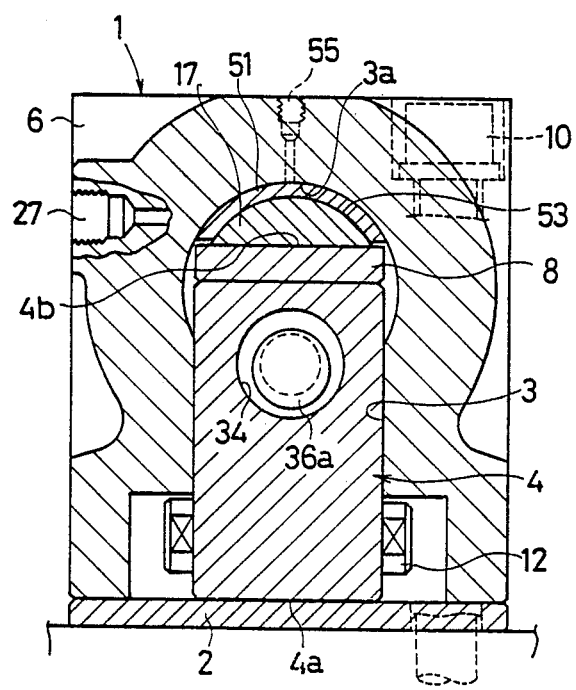

In FIGS. 1 through 3 symbol 1 designates a clamp housing of a hydraulic clamp and symbol 2 designates its bottom plate, and in the clamp housing 1 there is formed a drive chamber 3 with its front end (the left side in FIG. 1, and so forth) open. In the front part of the drive chamber 3 a clamp arm 4 is inserted to be longitudinally movable and vertically pivotable, and in the rear part (on the right side) thereof a hydraulic cylinder 5 for driving the clamp arm 4 is installed. Behind the clamp housing 1 a limit switch casing 6 is fastened thereto and a pair of limit switches (not illustrated) provided in this limit switch casing 6 are interlocked with the clamp arm 4 through a switch actuating device 9. The hydraulic clamp is fixedly secured onto the fixing plate P by means of a plurality of bolts 10.

Firstly the clamp arm 4 will be explained hereinafter.

The clamp arm 4 is inserted in the drive chamber 3 to be longitudinally movable and a stop surfaces 11 are provided in the fore lower portion of the clamp housing 1 for limiting the forward movement of the clamp arm 4 beyond a given range. There is provided a mating shaft 12 laterally through the rear part of the clamp arm 4, and the forward movement of the clamp arm 4 is checked when this mating shaft 12 has come into contact with the stop surfaces 11.

In the bottom near the rear end of the clamp arm 4 there is provided a fulcrum portion 4a and about this fulcrum portion 4a the clamp arm 4 is vertically pivotable with respect to the bottom plate 2. A driven piece 8 made of such a material as to have a good durability is fixedly fitted in the upper surface of the middle portion of the clamp arm 4. There is provided a driven portion 4b on the upper surface of the driven piece 8. Further, there is provided a clamping portion 4c at the swingable end of the underside of the fore portion of the clamp arm 4. Near the swingable front end of the underside of the clamp arm 4 a scraper 13 is inserted in a mating hole to be vertically slidable and pushed toward the bottom plate 2 by a return spring 14.

Between a wedge retaining surface 3a defining the upper surface of the drive chamber 3 and the driven portion 4b of the clamp arm 4 there is formed a wedge-shaped space 16 becoming narrower toward the front end, and into the wedge-shaped space 16 a driving wedge 17 is inserted from behind. The driving wedge 17 made of a durable material is interlockingly connected with the above-mentioned hydraulic cylinder 5. By the way, the top of the clamp arm 4 is adapted to be brought into contact with another scraper 18 made of sheet spring and fastened on the front end of the clamp housing 1.

Then the hydraulic cylinder 5 will be explained.

In the rear portion of the clamp housing 1 there is provided a longitudinally extending cylinder chamber 5a and into this cylinder chamber 5a a piston 21 is inserted oiltight to be slidable. Behind the piston 21 there is provided a clamping hydraulic chamber 22 and in front of the piston 21 there is provided an unclamping hydraulic chamber 23. These hydraulic chambers 22, 23 are provided with pressure oil supply/discharge ports 27, 28 respectively. The driving wedge 17 is formed integrally with the fore upper portion of a piston rod 26 projected forward from the front surface of the piston 21. In the clamping hydraulic chamber 22 there is provided a clamping force holding spring 29 between a hydraulic chamber lid 24 and the piston rod 26. The driving wedge 17 is kept constantly pushed forward by this clamping force holding spring 29.

An engaging portion 31 for causing the clamp arm 4 to retract after the driving wedge 17 has withdrawn by a predetermined dimension is provided to engage the piston rod 26 with the clamp arm 4, and there is provided a clamp arm pushing spring 32 for keeping this clamp arm 4 pushed forward. That is, at the rear end of a spring receiving hole 34 formed in the upper portion of the clamp arm 4 there is provided a stepped portion 35 which reduces the diameter of the hole there. The spring receiving hole 34 has inserted a bolt-like engaging rod 36 from foreside, and the leg of the engaging rod 36 is screwed tight into the mating tapped hole in the piston rod 26, while the head 36a of the engaging rod 36 is arranged to be possible in contact with the stepped portion 35 of the spring receiving hole 34. The above-mentioned engaging portion 31 comprises the stepped portion 35 and the head 36a of the engaging rod 36. The clamp arm pushing spring 32 consisting of a compression coil spring is set between a spring base holding disc 38 kept is contact with the head 36a of the engaging rod 36 and a spring tip holding block 39 fixed in the front end of the spring receiving hole 34.

The above-mentioned hydraulic clamp functions as follows.

In FIG. 1, the changeover from the unclamping retracted condition C shown by the one-dot chain line to the extended clamping condition A shown by the two-dot chain line via the extended unclamping condition B is carried out as follows.

Under the unclamping retracted condition C, the hydraulic cylinder 5 is retracted so that the piston 21 and the driving wedge 17 are retracted to the right side. Under this condition, the piston 21 and the piston rod 26 are advanced by supplying the clamping hydraulic chamber 22 with a pressure oil through the clamping pressure oil supply/discharge port 27 and discharging the pressure oil from the unclamping hydraulic chamber 23 through the unclamping pressure oil supply/discharge port 28. Thereupon, firstly the clamp arm 4 is advanced by the resilient force of the pushing spring 32 so that the clamping portion 4c is projected outside the front plane of the drive chamber 3 to provide the extended unclamping condition (the unclamping condition) B shown by the solid line. Then, the clamp arm 4 is checked by the stop surfaces 11, and subsequently the driven portion 4b is pushed down by the driving wedge 17 while the driving wedge 17 is wedge-engaged between the wedge retaining surface 3a and the driven portion 4b. Thereby, the extended clamping condition (the clamping condition) A shown by the two-dot chain line is provided. Under this extended clamping condition A, even though an oil pressure within the clamping hydraulic chamber 22 is lowered by an oil leak and so on, the clamp arm 4 is held in this condition A so as to prevent the die D from slipping off because the clamping force holding spring 29 serves to resiliently push the clamping wedge 17 forward strongly and to maintain the wedge-engagement.

To the contrary, the changeover from the extended clamping condition A to the unclamping retracted condition C is carried out as follows.

By discharging the pressure oil from the clamping hydraulic chamber 22 through the clamping pressure oil supply/discharge port 27 and supplying the unclamping hydraulic chamber 23 with the pressure oil through the unclamping pressure oil supply/discharge port 28, the piston 21 and the piston rod 26 are retracted to the right side. Thereupon, while the clamp arm pushing spring 32 is kept urging the clamp arm 4 forward, the driving wedge 17 is retracted so as to firstly carry out the wedge-disengagement and to subsequently release the driven portion 4b. Thereby, the extended unclamping condition B can be provided. Then, the clam arm 4 is retracted by the piston rod 26 through the engaging portion 31 so that the clamping portion 4c can be retracted inside the front plane of the drive chamber 3 and the unclamping retracted condition C can be provided.

The above-mentioned switch actuating device 9 is provided with an extension detecting rod 41 and a retraction detecting rod 42 and functions as follows. When the clamp arm 4 is advanced from the unclamping retracted condition C to the extended unclamping condition B by the hydraulic cylinder 5, the extension detecting rod 41 is advanced by an extension actuating portion 44 fixedly secured to the rear portion of the clamp arm 4 through an extension input portion 45 against a retraction spring 46 so as to actuate an extension detecting limit switch (not illustrated). When the clamp arm 4 is retracted from the extended unclamping condition B to the unclamping retracted condition C, the retraction detecting rod 42 is retracted by a retraction actuating portion 48 formed in the rear surface of the clamp arm 4 through a retraction input portion 49 against an extension spring (not illustrated) so as to actuate a retraction detecting limit switch (not illustrated).

In the above-mentioned hydraulic clamp, a sliding shuttle member 51 is interposed between the sliding contact surfaces of the driving wedge 17 and of at least one of the wedge retaining surface 3a and the driven portion 4b to be slidable within a given range in a forward and backward direction. Further, the coefficient of friction between the sliding contact surfaces is adapted to be made small by the interposition of the sliding shuttle member 51 therebetween.

Figure 4:
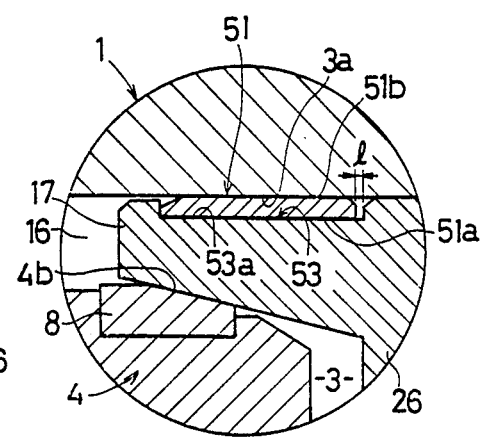

As shown in FIGS. 3 and 4, a groove 53 for inserting the sliding shuttle member 51 is formed in the upper surface of the driving wedge 17 in a partial-circular configuration in a side view and the mating sliding shuttle member 51 is inserted in the insertion groove 53 to be slidable in the forward and backward direction. A gap l for permitting the forward and backward movement of the sliding shuttle member 51 is preferably settled only a little larger than the retracting distance for wedge-disengagement of the driving wedge 17 at the time of the unclamping actuation. The sliding shuttle member 51 is preferably made of such a material as to have a smaller coefficient of friction relative to the bottom surface 53a of the insertion groove 53 than relative to the wedge retaining surface 3a. As the materials of the principal component parts of the hydraulic clamp, a gray cast iron is used for the clamp housing 1, a machine structural carbon steel is used for the clamp arm 4, a machine structural carbon steel of chrome-molybden system applied with a surface hardening such as a nitriding and the like is used for the driven piece 8, the driving wedge 17 and the piston 21, and an alloy steel of nickel-chrome system applied with a surface hardening is used for the sliding shuttle member 51.

A lubricating oil supply port 55 is opened in the wedge retaining surface 3a (refer to FIGS. 1 and 3). Therefore, a lubricating oil can be supplied between the wedge retaining surface 3a and the upper surface 51b of the sliding shuttle member 51 and between the lower surface 51a of the sliding shuttle member 51 and the bottom surface 53a of the insertion groove 53.

The operation of the sliding shuttle member 51 will be explained with reference to FIGS. 1, 4 and 5.

Under the extended unclamping condition B, as indicated by the solid line in FIG. 1 and also shown in FIG. 4, the driving wedge 17 is retracted and the sliding shuttle member 51 is left in the foreside (the left side).

When the extended unclamping condition B is changed over to the extended clamping condition A, the sliding shuttle member 51 operates as follows. When the driving wedge 17 is advanced by means of the hydraulic cylinder 5, at the beginning of that advancement, the sliding contact surfaces of the driving wedge 17 and of the sliding shuttle member 51 slide each other so that the sliding shuttle member 51 is retracted to the rear side (to the right side) of the driving wedge 17 by the gap l for permitting the movement. Subsequently, at the end of that advancement, the sliding contact surfaces of the wedge retaining surface 3a and of the sliding shuttle member 51 advancing together with the driving wedge 17 slide each other. Thereby, the driving wedge 17 is permitted to be advanced so that the driving wedge 17 can be engaged between the wedge retaining surface 3a and the driven portion 4b while the sliding shuttle member 51 is left on the rear side (on the right side) to provide the extended clamping condition A as indicated with the two-dot chain line in FIG. 1 and also as shown in FIG. 5.

Figure 5:
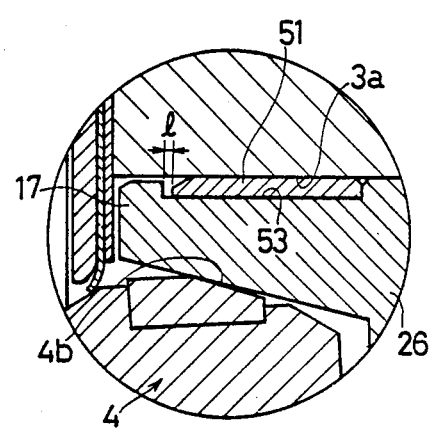

When the extended clamping condition A shown in FIG. 5 is changed over to the extended unclamping condition B shown in FIG. 4, the sliding shuttle member 51 operates as follows. The driving wedge 17 is retracted by means of the hydraulic cylinder 5, at the beginning of that retraction, the sliding contact surfaces of the driving wedge 17 and of the sliding shuttle member 51 located on the rear side (on the right side in the figure) of the driving wedge 17 slide each other so that the wedge-engagement between both the wedge 17 and the member 51 can be released by a small force and that the sliding shuttle member 51 can be advanced to the foreside (to the left side) of the driving wedge 17 by the gap l for permitting the movement. Subsequently, at the end of the retraction, the sliding contact surfaces of the wedge retaining surface 3a and of the sliding shuttle member 51 retracting together with the driving wedge 17 slide each other. Thereby, the driving wedge 17 is permitted to be retracted to provide the unclamping condition B in which the sliding shuttle member 51 is left on the foreside of the driving wedge 17.

Figure 6:
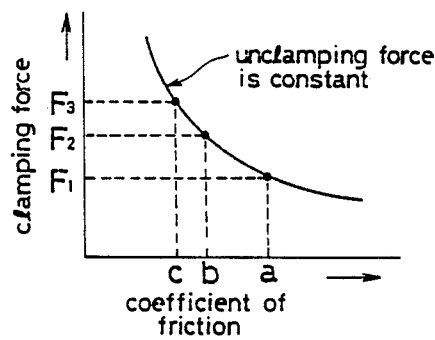

Since the sliding shuttle member 51 is a small component part separate from the clamp housing 1, the driving wedge 17 and the clamp arm 4, it is easy to precisely finish the sliding contact surface thereof and besides to select the specific material having a small coefficient of friction for the member 51. Therefore, it becomes easy to reduce the coefficient of statical friction between the sliding shuttle member 51 and the driving wedge 17 so that the friction difference between the statical frictional force at the beginning of the unclamping actuation and the dynamical frictional force at the end of the clamping actuation can be made small. Accordingly, as shown in FIG. 6, when comparing with such a reference condition that the unclamping force is settled constant, a clamping force $F_2$ in the case of a small coefficient of friction b is increased by the above-mentioned difference with respect to a clamping force $F_1$ in the case of a large coefficient of friction a. Further, in case that a lubricant is interposed between the above-mentioned sliding contact surfaces, as a coefficient of friction c becomes less, a clamping force $F_3$ becomes larger.

Incidentally, the lubricant may be supplied at least between the lower surface 51a of the sliding shuttle member 51 and the bottom surface 53a of the insertion groove 53. As the lubricant, a grease may be used instead of the lubricating oil.

Further, instead of the supply of the lubricant to the sliding contact surface of the sliding shuttle member 51, the sliding shuttle member 51 may be coated with a solid lubricant. As the solid lubricant, a molybdenum disulfide, a graphite, a fluororesin and a composite of those substances may be used.

FIGS. 7 through 11 are views showing variations of the sliding shuttle member 51 and corresponding to FIG. 4 respectively.

Figure 7:
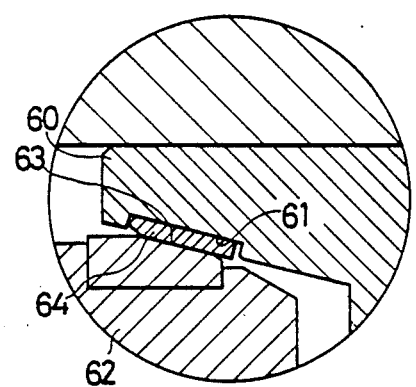

In the variation shown in FIG. 7, the groove 61 for inserting the sliding shuttle member 64 is formed in the underside of the driving wedge 60 so that the sliding shuttle member 64 can be interposed between the sliding contact surfaces of the driven portion 63 of the clamp arm 62 and of the driving wedge 60.

Figure 8:
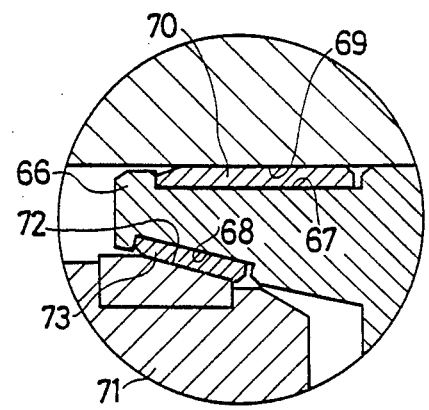

In the variation shown in FIG. 8, the insertion grooves 67, 68 are formed in both the upper surface and the lower surface of the driving wedge 66 so that the first sliding shuttle member 70 can be interposed between the sliding contact surfaces of the wedge retaining surface 69 and of the driving wedge 66 and the second sliding shuttle member 73 can be interposed between the sliding contact surfaces of the driving wedge 66 and of the driven portion 72 of the clamp arm 71.

Figure 9:
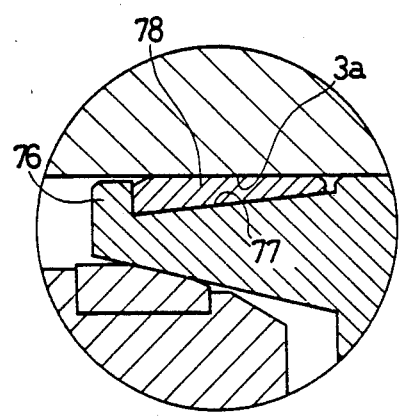

In the variation shown in FIG. 9, the insertion groove 77 is formed in the upper surface of the driving wedge 76 in such a configuration as to get shallower toward the rear side thereof and the sliding shuttle member 78 is formed in a tapered configuration corresponding to that of the insertion groove 77.

Figure 10:
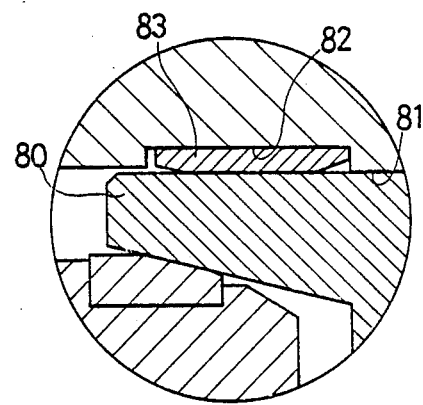

In the variation shown in FIG. 10, both the upper and the lower surfaces of the driving wedge 80 are formed straight and the sliding shuttle member 83 is inserted into the insertion groove 82 concaved in the wedge retaining surface 81. In this way, in case that the sliding shuttle member 83 is supported by the wedge retaining surface 81, the sliding shuttle member 83 is left on the rear side (on the right side) of the wedge retaining surface 81 under the unclamping condition. The sliding shuttle member 83 is advanced with respect to the wedge retaining surface 81 at the time of the clamping extending actuation and retracted with respect to the wedge retaining surface 81 at the time of the unclamping retracting actuation.

Figure 11:
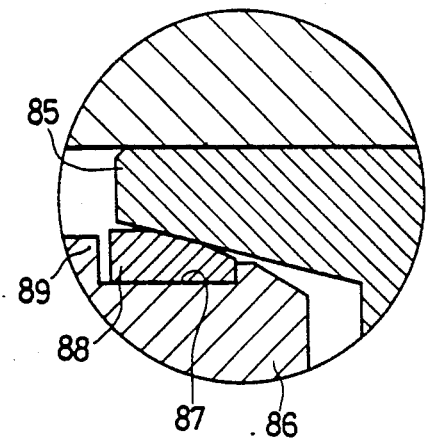

In the variation shown in FIG. 11, similarly to that shown in FIG. 10, both the upper and lower surfaces of the driving wedge 85 are formed straight. As a different constitution, the insertion groove 87 is formed in the top of the clamp arm 86. The sliding shuttle member 88 composed of the driven piece is inserted into the insertion groove 87 and the driven portion 89 is provided in the peripheral wall of the insertion groove 87. The sliding shuttle member 88 operates the same as that shown in FIG. 10.

Figure 12:
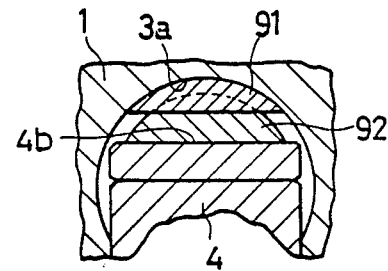
Figure 13:
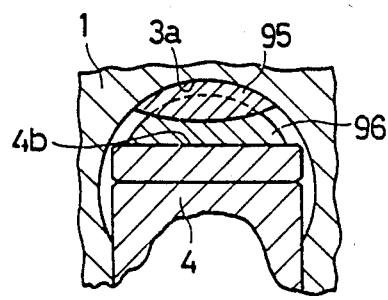
Figure 14:
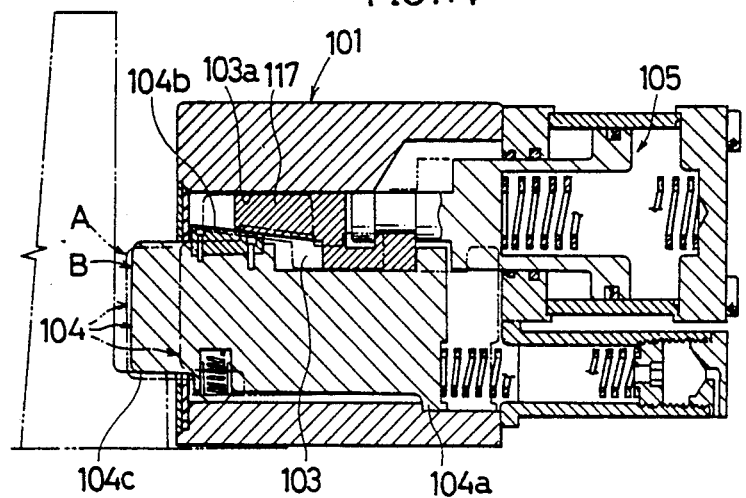
FIG. 14 is a view showing a conventional embodiment and corresponding to FIG. 1.

FIGS. 12 and 13 show variations of the mounting constitution for the sliding shuttle member and are views corresponding to FIG. 3 respectively. By the way, the same component parts as those shown in FIG. 3 are designated by the same symbols correspondingly.

In the variation shown in FIG. 12, the sliding contact surfaces of the sliding shuttle member 91 and of the driving wedge 92 are flat.

In the variation shown in FIG. 13, the sliding contact surfaces of the sliding shuttle member 95 and of the driving wedge 96 are curved in such a configuration as to project downward.

Incidentally, through the above-mentioned hydraulic clamp is adapted to change over the clamp arm to the extended clamping condition A, the extended unclamping condition B and the unclamping retracted condition C, the hydraulic clamp according to the present invention may be changed over between the clamping condition and the unclamping condition by the vertical swinging of the clamp arm and the unclamping retracted condition C may be omitted.

In case that the sliding shuttle member is composed of a plurality of thin members stacked vertically, even though any pair of sliding contact surfaces are damaged, the slide of the member is permitted through other sliding contact surfaces. Therefore, the clamping and the unclamping operations can be carried out more smoothly and the service time of the hydraulic clamp can be prolonged.

What is claimed is:

1. A hydraulic clamp comprising:
   a clamp housing;
   a drive chamber formed in said clamp housing with its front end open, and an upper part of said drive chamber being defined by a stationary wedge retaining surface;
   a clamp arm inserted in said drive chamber to be vertically pivotable;
   said clamp arm being provided in its rear part with a fulcrum portion, at its middle top part with a driven portion and at its front part with a clamping portion, respectively;
   a driving wedge inserted between said wedge retaining surface and said driven portion from behind;
   a hydraulic cylinder provided behind said driving wedge to be forward extendable;
   said driving wedge being adapted to be moved longitudinally by said hydraulic cylinder,
   wherein under the extended condition of said hydraulic cylinder said driving wedge being advanced to push down the driven portion and to provide the clamping condition, and under the retracted condition of said hydraulic cylinder said driving wedge being retracted to release the driven portion and to provide the unclamping condition; and
   a sliding shuttle member interposed between sliding contact surfaces of said driving wedge and one of said wedge retaining surface and (b) said driven portion to be slidable in a forward and backward direction within a given range of movement so as to reduce a coefficient of friction between said sliding contact surfaces by the interposition of said sliding shuttle member therebetween.

2. A hydraulic clamp as recited in claim 1, wherein a sliding shuttle member insertion groove is formed in one of said sliding contact surfaces, and said sliding shuttle member is inserted in said insertion groove to be slidable in the forward and backward direction.

3. A hydraulic clamp as recited in claim 2, wherein said sliding shuttle member is inserted in said insertion groove so that a gap is formed at either end of said insertion groove permitting a forward and backward movement of said sliding shuttle member along said insertion groove.

4. A hydraulic clamp as recited in claim 2, wherein said sliding member insertion groove is formed in a lower one of said sliding contact surfaces, and a lubricant is retained in said insertion groove.

5. A hydraulic clamp as recited in claim 2, wherein one of upper and the lower sliding contact surfaces of the sliding shuttle member, which one sliding contact surface is on the side of the sliding shuttle member inserting groove, is coated with a solid lubricant.

6. A hydraulic clamp as recited in claim 2, wherein said sliding shuttle member is interposed between the wedge retaining surface and the driving wedge,
   said sliding shuttle member insertion groove is formed in an upward facing sliding contact surface of the driving wedge and a lubricant is retained in said insertion groove, and
   at least the lower one of upper and the lower sliding contact surfaces of the sliding shuttle member is coated with a solid lubricant.

7. A hydraulic clamp comprising:
   a clamp housing having front and back end defining a chamber therein, the chamber opening through the front of the housing;
   a fulcrum stopper defined by the housing within the chamber near the back of the housing;
   a clamp arm slidably disposed in the chamber so as to be movable between a retracted position and an extended position wherein it exerts a clamping force on a workpiece, the clamp arm having a fulcrum portion adjacent a first end which engages the fulcrum stopper at the limit of the arms extended position;
   a sloping wedge surface formed on a second end of the clamp arm, the surface sloping downwardly in a direction toward the back end of the housing;
   a driving wedge element disposed in the chamber between the sloping wedge surface and the housing so as to be slidable with respect to the housing and the clamp arm;
   hydraulic cylinder means attached to the housing having a piston rod extending into the chamber and attached to the driving wedge element such that extension of the piston rod from the cylinder means causes the clamp arm to move from its retracted position to its extended position; and
   a shuttle member interposed between a sliding contact surface of said driving wedge and an associated opposed sliding contact surface of either said housing or said sloping wedge surface, said shuttle member slidable in a forward and backward direction within a predetermined range of movement so as to reduce friction between said sliding contact surfaces by the interposition of said sliding shuttle member therebetween.

8. A hydraulic clamp as recited in claim 7, wherein a sliding shuttle member insertion groove is formed in one of said sliding contact surfaces, said sliding shuttle member slidably positioned in said insertion groove in the forward and backward direction.

9. A hydraulic clamp as recited in claim 8, wherein said insertion groove is longer than said sliding shuttle member inserted therein thereby permitting a forward and backward movement of said sliding shuttle member along said insertion groove.

10. A hydraulic clamp as recited in claim 8, wherein said sliding shuttle member insertion groove is formed in a lower one of said sliding contact surfaces, and a lubricant is retained in said insertion groove.

11. A hydraulic clamp as recited in claim 8, wherein one of upper and the lower sliding contact surfaces of the sliding shuttle member, which one sliding contact surface is on the side of the sliding shuttle member inserting groove, is coated with a solid lubricant.

12. A hydraulic clamp as recited in claim 8, wherein said sliding shuttle member is interposed between the clamp housing and the driving wedge, said sliding shuttle member insertion groove is formed in an upward facing sliding contact surface of the driving wedge and a lubricant is retained in said insertion groove, and a lower sliding contact surface of the sliding shuttle member is coated with a solid lubricant.

* * * * *